(12) United States Patent
Messmer et al.

(10) Patent No.: US 11,397,710 B1
(45) Date of Patent: *Jul. 26, 2022

(54) SCHEMA TOOL FOR NON-RELATIONAL DATABASES

(71) Applicant: Progress Software Corporation, Bedford, MA (US)

(72) Inventors: Broderick Messmer, Raleigh, NC (US); Justin Moore, Clayton, NC (US); Philip Prudich, Cary, NC (US)

(73) Assignee: Progress Software Corporation, Burlington, MA (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/691,155

(22) Filed: Nov. 21, 2019

Related U.S. Application Data

(63) Continuation of application No. 14/085,557, filed on Nov. 20, 2013, now Pat. No. 10,489,355.

(51) Int. Cl.
*G06F 17/00* (2019.01)
*G06F 16/21* (2019.01)

(52) U.S. Cl.
CPC ................... *G06F 16/211* (2019.01)

(58) Field of Classification Search
None
See application file for complete search history.

(56) References Cited

U.S. PATENT DOCUMENTS

| | | | |
|---|---|---|---|
| 5,291,583 A | 3/1994 | Bapat | |
| 5,295,256 A | 3/1994 | Bapat | |
| 5,557,788 A | 9/1996 | Inoue | |
| 5,675,785 A * | 10/1997 | Hall | G06F 16/24539 707/999.102 |
| 5,819,251 A | 10/1998 | Kremer et al. | |
| 5,983,232 A * | 11/1999 | Zhang | G06F 16/90339 707/999.102 |
| 6,694,306 B1 * | 2/2004 | Nishizawa | G06F 16/24539 707/999.102 |
| 6,718,320 B1 * | 4/2004 | Subramanian | G06F 16/24542 707/999.102 |
| 9,053,167 B1 * | 6/2015 | Swift | G06F 16/27 |
| 9,471,654 B1 * | 10/2016 | Bradley | G06F 16/212 |
| 9,824,127 B2 | 11/2017 | Prabhu et al. | |
| 9,886,483 B1 * | 2/2018 | Harrison | G06F 16/24544 |
| 2001/0018684 A1 | 8/2001 | Mild et al. | |

(Continued)

OTHER PUBLICATIONS

"Simba Tech, Inc. ""Connect Tableau to Any Big Data Source""" on Youtube, found at <https://www.youtube.com/watch?v=62gTu6IXxzM&t=2268> dated Sep. 24, 2013, 1 page, Any Data, Anywhere, Anytime."

*Primary Examiner* — Hasanul Mobin
(74) *Attorney, Agent, or Firm* — Patent Law Works

(57) ABSTRACT

A system and method for defining a relational schema for a non-relational database are disclosed. In one embodiment, the system identifies a non-relational database; obtains a data structure of the non-relational database; determines a relational schema type; generates a relational schema based on the determined schema type; determines whether the relational schema includes a plurality of relational tables; and responsive to determining that the relational schema includes a plurality of relational tables, defines a relation between at least two of the relational tables in the relational schema.

19 Claims, 8 Drawing Sheets

(56) References Cited

U.S. PATENT DOCUMENTS

| | | | |
|---|---|---|---|
| 2002/0059292 A1* | 5/2002 | Velasco | G06F 16/258 |
| 2002/0107840 A1* | 8/2002 | Rishe | G06F 16/289 |
| 2004/0193608 A1 | 9/2004 | Gollapudi et al. | |
| 2004/0236767 A1* | 11/2004 | Soylemez | G06F 16/283 |
| 2005/0289174 A1 | 12/2005 | Kolli et al. | |
| 2006/0173804 A1* | 8/2006 | Desai | G06F 16/86 |
| 2007/0022093 A1 | 1/2007 | Wyatt et al. | |
| 2007/0208721 A1* | 9/2007 | Zaman | G06F 16/283 |
| 2007/0239772 A1 | 10/2007 | Gupta | |
| 2008/0172366 A1* | 7/2008 | Hannel | H04L 63/20 |
| 2008/0201338 A1* | 8/2008 | Castro | G06F 16/252 |
| 2009/0006348 A1* | 1/2009 | Gilula | G06F 16/2452 |
| | | | 705/14.54 |
| 2010/0145957 A1* | 6/2010 | Zhang | G06F 16/8365 |
| | | | 707/755 |
| 2011/0219028 A1* | 9/2011 | Dove | G06F 16/00 |
| | | | 707/770 |
| 2012/0136884 A1* | 5/2012 | Kanawa | G06F 16/8358 |
| | | | 707/E17.07 |
| 2012/0158655 A1 | 6/2012 | Dove et al. | |
| 2012/0324219 A1 | 12/2012 | Braun et al. | |
| 2013/0097081 A1 | 4/2013 | Leavitt et al. | |
| 2013/0173664 A1 | 7/2013 | Xue et al. | |
| 2013/0254743 A1 | 9/2013 | Howard | |
| 2014/0201331 A1 | 7/2014 | Kershaw et al. | |
| 2014/0358852 A1 | 12/2014 | Yurchenko et al. | |
| 2015/0088924 A1* | 3/2015 | Abadi | G06F 16/90335 |
| | | | 707/769 |

\* cited by examiner

SCHEMA TOOL FOR NON-RELATIONAL DATABASES

CROSS-REFERENCE TO RELATED APPLICATIONS

The present application is a continuation of and claims priority to U.S. patent application Ser. No. 14/085,557, filed Nov. 20, 2013, titled "Schema Tool for Non-Relational Databases," the entirety of which is hereby incorporated by reference.

Applicants hereby notify the USPTO that the claims of the present application are different from those of the parent application and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

FIELD OF INVENTION

The present disclosure relates to connecting to a non-relational database and generating a relational schema for the non-relational database.

BACKGROUND

Non-relational databases including not only Structured Query Language (NoSQL) databases are increasingly common. However, common drivers may use relational database query languages. For example, Open Database Connectivity (ODBC) and Java Database Connectivity (JDBC) drivers receive Structured Query Language (SQL) as a query language. A problem is generating a relational schema for a non-relational database that may be used by a driver designed to interface with a relational database in order to access the non-relational database.

Current methods and systems fail to provide a user-friendly mechanism to generate a relational schema for use by a driver such as an ODBC or JDBC driver to access the data stored in the non-relational database. Current methods and systems further fail to provide a user one or more options regarding the type of relational schema generated. For example, current methods and systems fail to present the user with an option to generate one of a customized relational schema, a normalized relational schema or a flattened relational schema. Moreover, current methods and systems fail to generate a relational schema comprising multiple tables and to define the relationships between those tables.

SUMMARY

In general, an innovative aspect of the subject matter described in this disclosure may be embodied in methods that include identifying, using one or more processors, a non-relational database; obtaining, using one or more processors, a data structure of the non-relational database; determining, using one or more processors, a relational schema type; generating, using one or more processors, a relational schema based on the determined schema type; determining, using one or more processors, whether the relational schema includes a plurality of relational tables; and responsive to determining that the relational schema includes a plurality of relational tables, defining, using the one or more processors, a relation between at least two of the relational tables in the relational schema.

According to another innovative aspect of the subject matter described in this disclosure, a system comprises a processor; and a memory storing instructions that, when executed, cause the system to: identify a non-relational database; obtain a data structure of the non-relational database; determine a relational schema type; generate a relational schema based on the determined schema type; determine whether the relational schema includes a plurality of relational tables; and responsive to determining that the relational schema includes a plurality of relational tables, define a relation between at least two of the relational tables in the relational schema.

Other implementations of one or more of these aspects include corresponding systems, apparatus, and computer programs, configured to perform the actions of the methods, encoded on computer storage devices. These and other implementations may each optionally include one or more of the following features.

For instance, the relational schema type is one of a flattened table schema type, a normalized table schema type and a customized schema type. For instance, the operations further include identifying a nested object in the non-relational database; parsing the nested object into one or more components; and wherein the generated relational schema includes a distinct table incorporating the nested object, wherein the distinct table includes columns associated with the one or more components of the nested object. For instance, the operations further include identifying a nested object in the non-relational database; parsing the nested object into one or more components; and wherein the generated relational schema includes a column for each subcomponent and at least one primary key. For instance, the operations further include presenting the data structure of the non-relational database to a user; receiving a selection of a portion of the data structure of the non-relational database for inclusion in the relational schema; and wherein the generated relational schema incorporates the selected portion of the non-relational database's data structure and omits an unselected portion of the non-relational database's data structure. For instance, the operations further include receiving a table definition; and wherein the relational schema is generated based on the table definition, the table definition determining one or more of the one or more tables included in the relational schema and the portions of the non-relational database associated with each of the one or more tables in the relational schema. For instance, the relational schema type is determined to be a customized schema type and the generated schema includes a first relational table based on a first nested object of the non-relational database and a table based on a flattened second nested object of the non-relational database. For instance, one or more of the relational schema type and the relationship between at least two tables in the relational schema are defined by user input. For instance, the non-relational database is a MongoDB database. For instance, the relational schema type is a hybrid normalized schema type.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
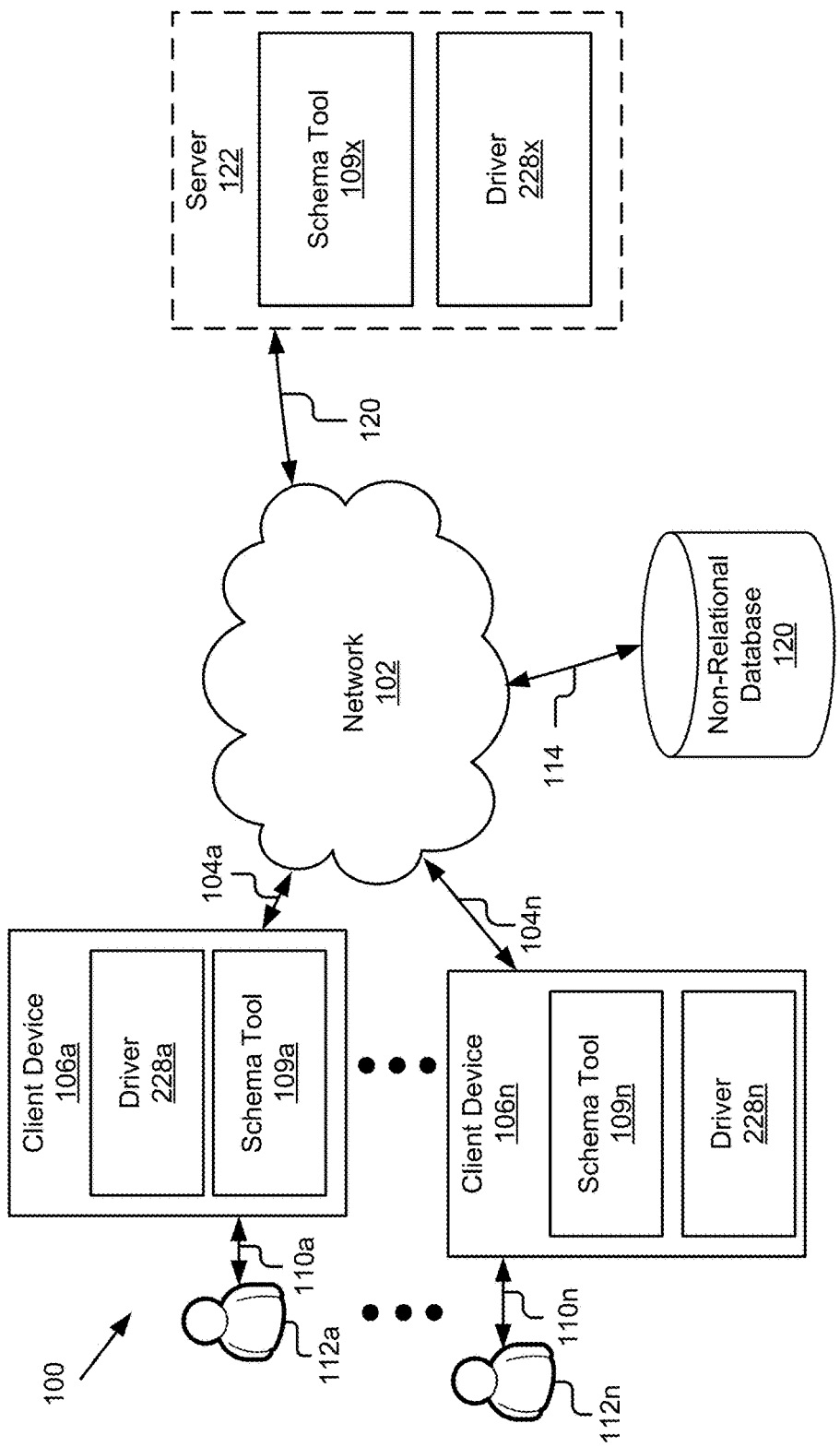
FIG. 1 is a block diagram illustrating an example system for generating a relational schema for a non-relational database according to one embodiment.

FIG. 1 is a block diagram illustrating an example system 100 for generating a relational schema for the non-relational database according to one embodiment. The illustrated system 100 includes client devices 106a . . . 106n, a non-relational database 120 and an optional server 122, which are communicatively coupled via a network 102 for interaction with one another. For example, the client devices 106a . . . 106n (also referred to individually and collectively as 106) may be respectively coupled to the network 102 via signal lines 104a . . . 104n and may be accessed by users 112a . . . 112n (also referred to individually and collectively as user 112) as illustrated by lines 110a . . . 110n. The non-relational database 120 may be coupled to the network 102 via signal line 114. The optional server 122 may be coupled to the network 102 via signal line 120. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Binary JavaScript Object Notation (BSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. In the depicted implementation, the client devices 106a . . . 106n respectively contain instances 109a . . . 109n of a schema tool 109.

The schema tool 109 described herein may work with and operate on data stored in any number of different formats, systems, or databases referred to collectively as "non-relational databases" or individually as a "non-relational database" throughout the disclosure. A non-relational database 120 may be a data storage system that allows data to be modeled in a way that deviates from a strict relational model for database management. For example, a non-relational database 120 may deviate from one or more of the strict relational model's concepts of normalization, table relationships, and consistency ensured by a logical schema. Non-relational databases may include, but are not limited to, one or more of non-traditional relational, NoSQL, NewSQL, object-oriented, document-oriented and object-relational databases. Moreover, it should be recognized that these "non-relational databases" may, in some embodiments, support the relational model in addition to other database models.

The schema tool 109 may be storable in a memory and executable by a processor of a client device 106. In some embodiments, the client device 106 includes one or more applications (not shown) that use the schema tool 109 or its outputs. For example, in one embodiment, the client device 106 includes a driver 228 that uses the schema generated by the schema tool 109 to access data in the non-relational database 120. In one embodiment, the driver 228 is a relational language based driver (e.g. a JDBC driver or an ODBC driver) that uses the relational schema generated by the schema tool 109 to translate relational queries from a relational database language (e.g. SQL) for the non-relational database 120 and translates the response from the non-relational database 120 into the relational language.

The optional server 122 may include one or more computing devices having data processing, storing, and communication capabilities. For example, the server 122 may include one or more hardware servers, server arrays, storage devices, systems, etc., and/or may be centralized or distributed/cloud-based. In some implementations, the server 122 may include one or more virtual servers, which operate in a host server environment and access the physical hardware of the host server including, for example, a processor, memory, storage, network interfaces, etc., via an abstraction layer (e.g., a virtual machine manager).

In one embodiment, the server 122 includes an instance of the schema tool 109 and a driver 228x that uses the relational schema generated by the schema tool 109. For example, in one embodiment, the driver 228x is a relational language based driver (e.g. a JDBC driver, an ODBC driver) which receives queries from a client device 106 in a relational database language (e.g. SQL) and the driver 228x of the server 122 translates the query for the non-relational database 120 and translates the response from the non-relational database 120 into the relational database language using the relational schema generated by the schema tool 109. Such an embodiment may beneficially provide connectivity to a non-relational database as a web service using drivers designed for relational databases. In one embodiment, the server 122 provides client devices 106 and their applications (not shown) connectivity to a variety of hardware and services without the client device 106 including additional drivers. For example, server 122 may host driver 228x for exposing data stored in a non-relational database 120 as well as other drivers (not shown) that may expose an application (not shown) to other hardware and/or services.

The non-relational database 120 may include one or more non-transitory computer-readable mediums for storing data. While the illustrated non-relational database 120 is illustrated as connected to the network 102 via signal line 114, in some embodiments, the non-relational database 120 may be included in a memory or storage device (e.g. a hard disk drive) of the client device 106 or connected to (e.g. as a Direct Access Storage) a client device 106. In one embodiment, the non-relational database 120 includes a database management system (DBMS). For example, the DBMS may be a non-relational DBMS, for example, a NoSQL DBMS. In some instances, the DBMS may store data in multi-dimensional tables comprised of rows and columns, and manipulate, i.e., insert, query, update and/or delete, rows of data using programmatic operations. While only one non-relational database 120 is illustrated, it will be recognized that multiple non-relational databases 120 may exist. For example, in one embodiment, the non-relational database 120 is a distributed database.

In one embodiment, the non-relational database 120 is a NoSQL database. Depending on the embodiment the NoSQL database may be one of a key-value, column family, document-oriented and graph-oriented type database. In one embodiment, the non-relational database 120 is a document-oriented NoSQL database. For example, in one embodiment, the non-relational database is a MongoDB database. For clarity and convenience, MongoDB is referred to and used in many of the examples herein. However, it will be recognized that MongoDB is merely one example of a non-relational database and one example of a document-oriented, non-relational database and that other examples of non-relational databases (e.g. other types of NoSQL databases) and other examples of document-oriented non-relational databases exist and may be used without departing from the disclosure herein.

It should be understood that the system 100 illustrated in FIG. 1 is representative of an example system for generating a relational schema for a non-relational database according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
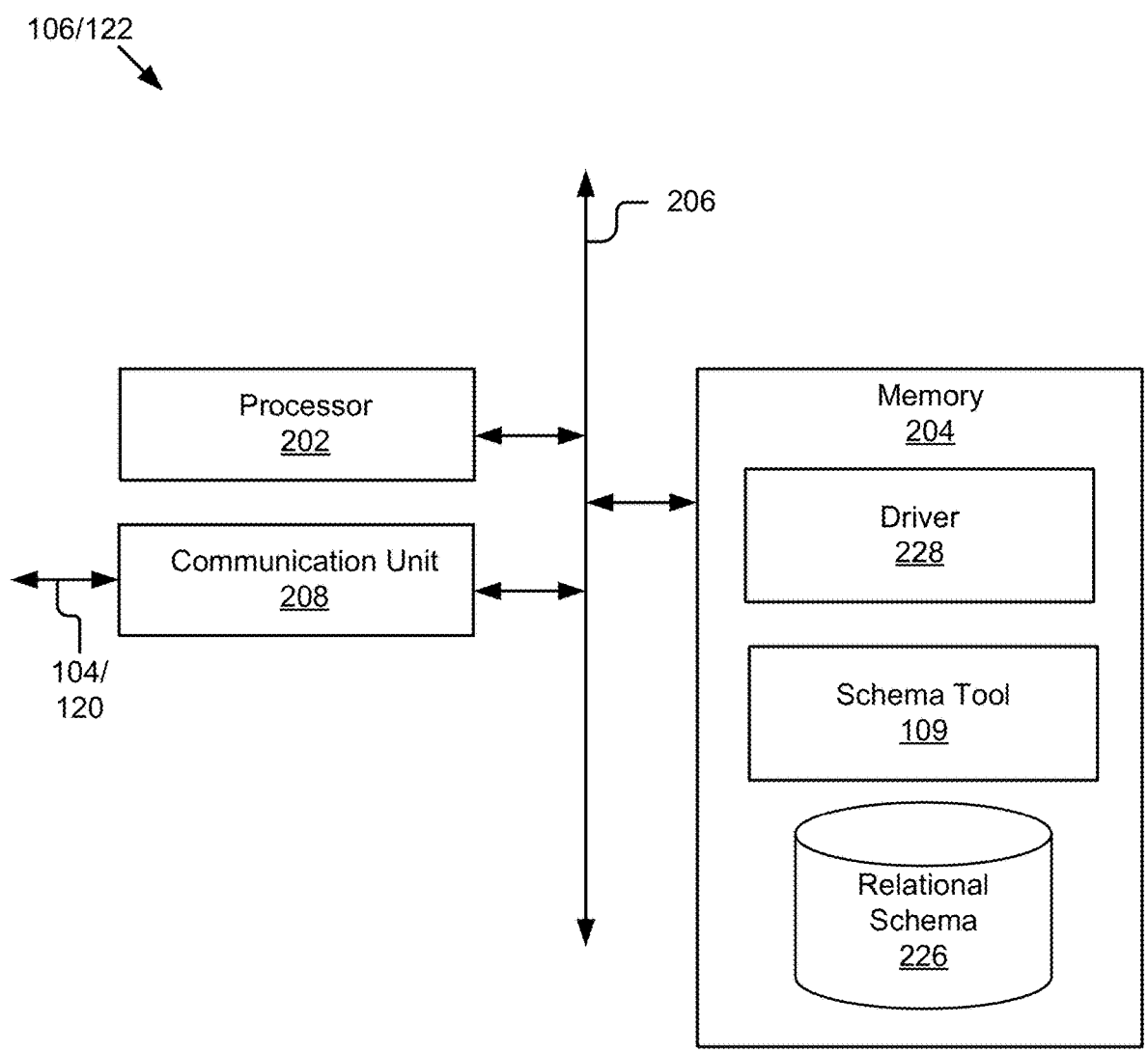
FIG. 2 is a block diagram illustrating an example computing device according to one embodiment.

FIG. 2 is a block diagram of an example computing device 106/122 according to one embodiment. The computing device 106/122, as illustrated, may include a processor 202, a memory 204 and a communication unit 208, which may be communicatively coupled by a communications bus 206. The computing device 106/122 depicted in FIG. 2 is provided by way of example and it should be understood that it may take other forms and include additional or fewer components without departing from the scope of the present disclosure. For example, while not shown, the computing device 106/122 may include a storage device, input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein may be applied to multiple entities in a system 100, for example, the computing device 106/122 may be a client device 106 or a server 122.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the computing device 106/122 including, for example, the memory 204 and communication unit 208.

The memory 204 may store and provide access to data to the other components of the computing device 106/122. In some implementations, the memory 204 may store instructions and/or data that may be executed by the processor 202. For example, in the illustrated embodiment, the memory 204 may store the schema tool 109. The memory 204 is also capable of storing other instructions and data, including, for example, an operating system, hardware drivers, other software applications, databases, etc. The memory 204 may be coupled to the bus 206 for communication with the processor 202 and the other components of the computing device 106/122.

In the illustrated embodiment, the memory 204 stores a schema tool 109, a relational schema 226 and a driver 228. In one embodiment, the schema tool 109 generates the relational schema 226, which is used by the driver 228 to access the non-relational database 120. While the illustrated embodiment, shows that the relational schema 226 may be stored on the client device 106 and/or server 122. In some embodiments, the relational schema 226 may be stored on the network 102. In some embodiments, the relational schema 226 may be stored within a database server (not shown), e.g., a data base server (not shown) that is associated with the non-relational database 120 for which the relational schema 226 was created.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing device 106/122 and/or between computing devices (e.g. between one or more of the client device 106 and non-relational database 120), a network bus system including the network 102 or portions thereof, a processor mesh, a combination thereof, etc. In some implementations, the schema tool 109, its sub-components and various other software operating on the computing device 106/122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

As mentioned above, the computing device 106/122 may include other and/or fewer components. Examples of other components may include a display, an input device, a sensor, etc. (not shown). In one embodiment, the computing device 106/122 includes a display. The display may display electronic images and data for presentation to a user 112. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the computing device 106/122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Schema Tool 109

Figure 3:
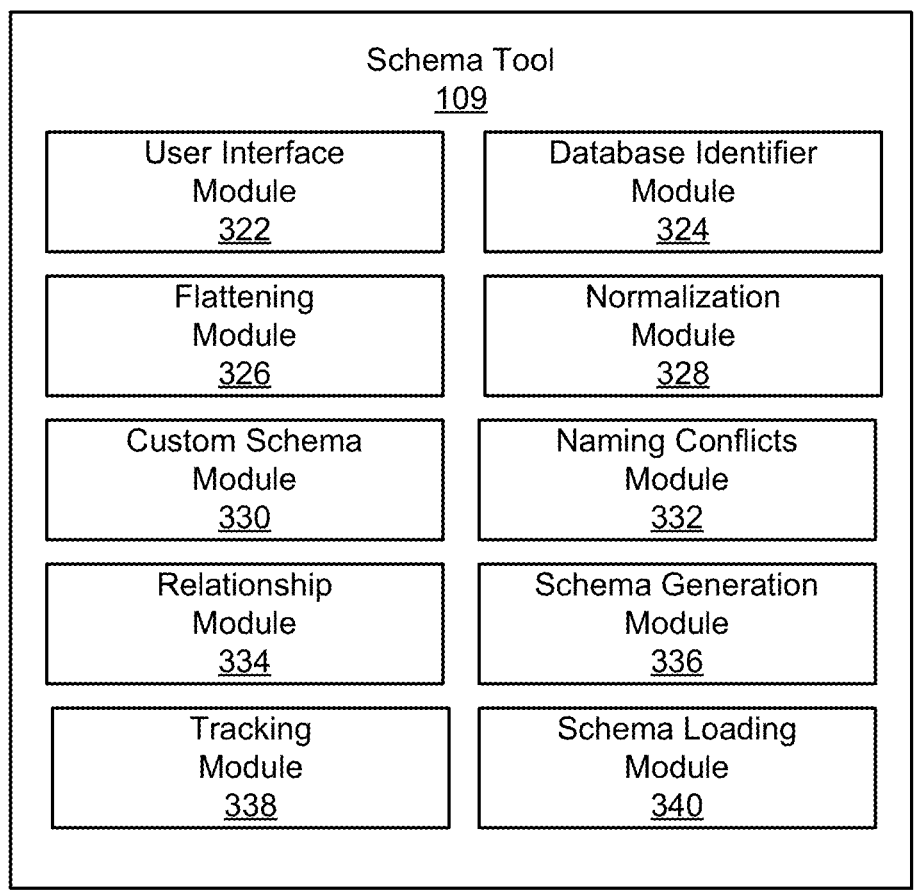
FIG. 3 is a block diagram of a relational schema generation module according to one embodiment.

Referring now to FIG. 3, the schema tool 109 is shown in more detail according to one embodiment. FIG. 3 is a block diagram of the schema tool 109 included in a computing device 106/122 according to one embodiment.

The schema tool 109 generates a relational schema for a non-relational database 120, which may be used by a driver 228 to expose the data in the non-relational database 120 to access using a relational query language (e.g. SQL). In one embodiment, the schema tool 109 provides one or more wizards, which guide the user 112 through the process of generating a relational schema for a non-relational database 120. Such an embodiment may beneficially allow less technical users to define the relational schema generated. In one embodiment, a user 112 may use the schema tool 109 to generate one or more different types of relational schemas (e.g. flattened, normalized (regular and/or hybrid), and custom schemas) at the user's option. For example, in some embodiments a user may select from multiple relational schema types (e.g. select from flattened, normalized or customized) while in other embodiments the relational schema type may be predetermined (e.g. only one relational schema type is supported and generated). In one embodiment, the schema tool may allow the user to create and/or modify relationships between tables defined in the relational schema.

In one embodiment, the driver 228 may launch the schema tool 109 "headlessly" (i.e. no user interfaces or interaction is required) to generate a default relational schema and a user 112 may subsequently launch the schema tool 109 and use a wizard to modify an existing or create a new relational schema. For example, in one embodiment, the driver 228 detects a new non-relational database 120 and launches the schema tool 109 headlessly to generate a flattened (or normalized depending on the embodiment) relational schema of the non-relational database 120, and a user 112 may subsequently launch the schema tool 109 (e.g. by double-clicking on an associated icon) and use a wizard provided by the schema tool 109 to create a new relational schema or modify the default schema requested by the driver.

In one embodiment, the schema tool 109 is a stand-alone Java application. For example, in one embodiment, the schema tool may be launched from a configuration pane that launches from an ODBC Data Source Administration application. In another embodiment, the schema tool 109 may be a stand-alone desktop application that a JDBC user launches by selecting an associated icon.

In one embodiment, the schema tool 109 supports one or more command line arguments. Examples of command line arguments that the schema tool 109 may support are displayed below in Table I. However, it should be recognized that Table I is not an exhaustive list. Depending on the embodiment, the schema tool 109 may support command line arguments that are different in number, form and effect.

TABLE I

Example Command Line Arguments According to One Embodiment

| Command Line Argument: | Description |
| --- | --- |
| -h <host> | sets the host of the database server |
| -p <port> | sets the port of the database server |
| -d <database Name> | the database/catalog to connect to on the database server |
| -u <user> | user name to login |
| -pwd <password> | password |

In one embodiment, one or more aspects of the schema tool 109 are user 112 configurable. For example, in some embodiments, one or more of a preview data size, a statistics collection size, a default max varchar size, etc. may be configured.

In one embodiment, the schema tool 109 comprises a user interface module 322, a database (DB) identifier module 324, a flattening module 326, a normalization module 328, a custom schema module 330, a naming conflicts module 332, a relationship module 334, a schema generation module 336, a tracking module 338 and a schema loading module 340. It will be recognized that the modules 322, 324, 326, 328, 330, 332, 334, 336, 338, 340 comprised in the schema tool 109 are not necessarily all on the same computing device 106/122. In one embodiment, the modules 322, 324, 326, 328, 330, 332, 334, 336, 338, 340 and/or their functionality are distributed across multiple computing devices 106/122. For example, in one embodiment, the modules 322, 324, 326, 328, 330, 332, 334, 336, 338, 340 are distributed across multiple servers 122.

The user interface module 322 includes code and routines for one or more of receiving user input and generating one or more graphical user interfaces (GUIS). In one embodiment, the user interface module 322 is a set of instructions executable by the processor 202. In another embodiment, the user interface module 322 is stored in the memory 204 and is accessible and executable by the processor 202. In either embodiment, the user interface module 322 is adapted for cooperation and communication with the processor 202, other components of the computing device 106/122 and other components of the schema tool 109.

In one embodiment, the user interface module 322 receives user input. In one embodiment, the user interface module 322 may receive user input via one or more of a keyboard, mouse, microphone, camera or other input device of a client device 106. For example, in one embodiment, the user interface receives an identifier of a non-relational database from a user 112 via a keyboard and selection of a relational schema type via a click from a mouse.

In one embodiment, the user interface module 322 generates one or more GUIs for presentation to a user. For example, the user interface 322 may generate a GUI that when presented on a display (e.g. a display of the client device 106) may present information to the user (e.g. displays a relational schema being generated), prompts the user to input information (e.g. to identify a non-relational database or specify a relational schema type to be generated), and allows the user to graphically interact with data (e.g. selecting portion of the data structure of the non-relational database for inclusion and/or exclusion from the relational schema). It will be recognized that the preceding examples are merely a few possible examples and not an exhaustive list. More examples exist and more examples may be mentioned herein.

In one embodiment, the user interface module 322 generates all the GUIs mentioned or alluded to herein. Examples of such GUIs may include, but are not limited to one or more of a GUI for receiving an identifier of a non-relational database (e.g. textboxes for inputting routing and authentication information for the non-relational database), a GUI displaying one or more user selectable schema type options (e.g. a radio button associated with each of normalizing nested objects, flattening nested objects and defining a custom schema), a GUI for allowing the user to visualize and select portions of the non-relational database, a GUI allowing the user to preview the relational schema based on schema type options and user selections and inputs, a GUI for notifying a user of naming conflicts and/or displaying naming conflicts, a GUI allowing the user to visualize and define one or more relationships between two or more tables in the relational schema, a GUI for modifying a previously defined relational schema, etc.

In one embodiment, the one or more GUIs generated by the user interface 322 are a schema "wizard," i.e., a series of one or more GUIs that guide and instruct a user through the generation of a relational schema of a non-relational database. Such an embodiment may beneficially allow a user, even an unsophisticated one, to visually and interactively define a desired relational schema of a non-relational database for generation and use.

For clarity and convenience, mention of the user interface module 322 may occasionally be omitted herein. For example, the user interface module 322 generates a GUI for presenting one or more relational schema types to a user and receiving a user input selecting a customized relational schema type may, for clarity and convenience, be written as receiving a user input selecting a customized relational schema type.

In one embodiment, the user interface module 322 passes one or more GUIs for presentation by the client device 106. In one embodiment, the user interface module 322 stores the one or more GUIs in memory 204 (or any other non-transitory storage medium communicatively accessible) for retrieval and presentation to a user 112.

In one embodiment, the user interface module 322 passes received user input to one or more of the schema tool 109 modules 324, 326, 328, 330, 332, 334, 336, 338, 340. In one embodiment, the user interface module 322 stores the received user input in memory 204 (or any other non-transitory storage medium communicatively accessible), and the other modules of the schema tool 109 may retrieve the received user input from the memory 204 (or other non-transitory storage medium).

The database (DB) identifier module 324 includes code and routines for identifying a non-relational database. In one embodiment, the table identifier module 324 is a set of instructions executable by the processor 202. In another embodiment, the table identifier module 324 is stored in the memory 204 and is accessible and executable by the processor 202. In either embodiment, the table identifier module 324 is adapted for cooperation and communication with the processor 202, other components of the computing device 106/122 and other components of the schema tool 109.

The DB identifier module 324 identifies a non-relational database for which the relational schema is generated. In one embodiment, identifying the non-relational database includes one or more of determining the non-relational database, obtaining the data structure of the non-relational database and obtaining data and/or metadata of the non-relational database.

In one embodiment, the DB identifier module 324 determines the non-relational database for which the relational schema is generated. In one embodiment, the DB identifier module 324 determines the non-relational database automatically. For example, in one embodiment, the DB identifier module 324 automatically detects a connection to the non-relational and identifies the non-relational database. In one embodiment, the DB identifier module 324 determines the non-relational database based on user input. For example, the DB identifier module 324 receives input specifying the non-relational database.

In one embodiment, the DB identifier module 324 obtains the data structure of the non-relational database. For example, the DB identifier module 324 acquires one or more of the columns and fields of the non-relational database. In one embodiment, the DB identifier module 324 acquires data of the non-relational database. For example, in one embodiment, the DB identifier module 324 obtains data (e.g. documents) from the non-relational database in order to identify nested objects within the non-relational database, i.e., in one embodiment, data from the non-relational database is analyzed and/or obtained to determine the data structure of the non-relational database.

In one embodiment, the DB identifier module 324 obtains metadata of the non-relational database. For example, in one embodiment, the DB identifier module 324 samples the non-relational database and obtains the data type(s) associated with one or more of a table, column and field of the non-relational database. In another example, the DB identifier module 324 obtains metadata including statistics about the non-relational database. Examples of statistics obtained by the DB identifier module 324 include, but are not limited to, occurrences of a given field vs. the number of documents/rows inspected, field types including, for example, type consistency and max data length for string data, etc.

In one embodiment, the DB identifier module 324 passes the non-relational database identification to one or more modules 322, 326, 328, 330, 332, 334, 336 of the schema tool 109. In one embodiment, the DB identifier module 324 stores the non-relational database identification in memory 204 (or any other non-transitory storage medium communicatively accessible). The other modules of the schema tool may retrieve the non-relational database identification from the memory 204 (or other non-transitory storage medium).

In one embodiment, a non-relational database may include one or more nested objects. For example, assume, again, that the non-relational database is MongoDB a document-oriented, non-relational database. In one embodiment, the non-relational database may include one or more nested, or embedded, objects. For example, an "employee" document in MongoDB may be defined by: "employee: {name: Brody, address: {street: 1234 Street, city: Raleigh, state: NC} emails: [brody.mes@123.com, brody.mes@456.com]}", which includes nested objects "address" and "emails." For clarity and convenience, this disclosure refers to this example document throughout the specification. However, it should be recognized this is merely one example that other examples of a non-relational database including one or more nested objects and that other non-relational databases and other nested objects exist.

The schema tool 109 may extract a nested object for inclusion in a relational schema. Depending on the embodiment, the schema tool 109 may extract the nested object for inclusion as a flattened nested object using the flattening module 326 or as a normalized nested object using the normalization module 328.

The flattening module 326 includes code and routines for flattening nested objects in a non-relational database. In one embodiment, the flattening module 326 is a set of instructions executable by the processor 202. In another embodiment, the flattening module 326 is stored in the memory 204 and is accessible and executable by the processor 202. In either embodiment, the flattening module 326 is adapted for cooperation and communication with the processor 202, other components of the computing device 106/122 and other components of the schema tool 109.

In one embodiment, the flattening module 326 determines the one or more nested objects to be flattened. In one embodiment, the flattening module 326 determines all the nested objects in a non-relational database are to be flattened. For example, assume a user 112 is presented and selects an option to generate a flattened relational schema type in which all tables of the non-relational database (e.g. all MongoDB collections) are flattened; in one embodiment, the flattening module 326 identifies all the nested objects within those tables and determines those nested objects are to be flattened.

In one embodiment, the flattening module 326 determines a set of one or more nested objects in a non-relational database are to be flattened. For example, assume a user 112 is presented and selects an option to generate a customized relational schema and identifies at least a portion of the non-relational database which the user 112 desires to be flattened and included in the relational schema; in one embodiment, the flattening module 326 identifies the nested objects within the identified portion of the non-relational database and determines the identified nested objects are to be flattened. In another example, assume a hybrid normalization schema type was selected by the user 112 (or as default by a driver 228 headlessly launching the schema tool 109), in one embodiment, the flattening module 326 identifies which (if any) nested objects should be flattened.

In one embodiment, the flattening module 326 determines no nested objects in a non-relational database are to be flattened. For example, assume a user 112 is presented and selects an option to generate a relational schema in which all tables of the non-relational database (e.g. all MongoDB collections) are normalized or, alternatively, to generate a customized schema in which no nested objects are selected for inclusion as flattened tables; in one embodiment, the flattening module 326 identifies zero nested objects for flattening.

The flattening module 326 flattens nested objects in a non-relational database table. In one embodiment, the flattening module 326 flattens the identified nested objects. Flattening models a nested object in the same relational table as the object (e.g. a document in a document-oriented non-relational database) in which the nested object is nested or embedded. For example, assume an object (e.g. a MongoDB document) includes a nested object; in one embodiment, when flattened, the table for the MongoDB document includes one or more columns associated with the nested object.

In one embodiment, flattening module 326 flattens a nested object by parsing, or dividing, the nested object into one or more components and generates a column associated with at least one component in the relational schema. For example, again referring to the MongoDB "employee" document example: "employee: {name: Brody, address: {street: 1234 Street, city: Raleigh, state: NC} emails: [brody.mes@123.com, brody.mes@456.com]}." In one embodiment, the flattening module 326 parses the nested objects (address and emails) into their respective components (street, city, state and the two e-mails). In one embodiment, the flattening module 326 flattens the "employee" document into a relational table including an id column, a name column, an address.street column, an address.city column, an address.state column, an emails.1 column and an emails.2 column. In one embodiment, the id column and the nested columns (e.g. address.street, address.city, and address.state) are used as a compound primary key. It should be noted that the names of the columns are merely examples and that different names and a different naming convention may be used. However, the naming convention used in the example may beneficially provide a user 112 insight into the relationship between columns in the relational schema and the objects and nested objects of the non-relational database. For example, the user 112 may discern that an "address" nested object, which included street, city and state was flattened to columns address.street, address.city and address.state in the relational schema.

In one embodiment, the flattening module 326 passes the flattened nested objects to the schema generation module 336. In one embodiment, the flattening module 326 stores the flattened nested objects in memory 204 (or any other non-transitory storage medium communicatively accessible). The other modules of the schema tool 109 including, e.g., the schema generation module 336, may retrieve the flattened nested objects by accessing the memory 204 (or other non-transitory storage medium).

The normalization module 328 includes code and routines for normalizing nested objects of a non-relational database. In one embodiment, the normalization module 328 is a set of instructions executable by the processor 202. In another embodiment, the normalization module 328 is stored in the memory 204 and is accessible and executable by the processor 202. In either embodiment, the normalization module 328 is adapted for cooperation and communication with the processor 202, other components of the computing device 106/122 and other components of the schema tool 109.

In one embodiment, the normalization module 328 determines the one or more nested objects to be normalized. In one embodiment, the normalization module 328 determines all the nested objects in a non-relational database are to be normalized. For example, assume a user 112 is presented and selects an option to generate a normalized relational schema type in which all tables of the non-relational database (e.g. all MongoDB collections) are normalized; in one embodiment, the normalization module 328 identifies all the nested objects within those tables and determines those nested objects are to be normalized.

In one embodiment, the normalization module 328 determines a set of one or more nested objects in a non-relational database are to be normalized. For example, assume a user 112 is presented and selects an option to generate a customized relational schema and identifies at least a portion of the non-relational database which the user 112 desires to be normalized and included in the relational schema; in one embodiment, the normalization module 328 identifies the nested objects within identified portion of the non-relational database and determines the identified nested objects are to be normalized. In another example, assume a hybrid normalization schema type was selected by the user 112 (or as default by a driver 228 headlessly launching the schema tool 109), in one embodiment, the normalization module 326 identifies which (if any) nested objects should be normalized.

In one embodiment, the normalization module 328 determines no nested objects in a non-relational database are to be normalized. For example, assume a user 112 is presented and selects an option to generate a relational schema in which all tables of the non-relational database (e.g. all MongoDB collections) are flattened or, alternatively, to generate a customized schema in which no nested objects are selected for inclusion as one or more normalized tables; in one embodiment, the normalization module 328 identifies zero nested objects for normalization.

The normalization module 328 normalizes nested objects in a non-relational database table. Normalizing models an object (e.g. a document in a document-oriented non-relational database) including any nested objects therein as one or more distinct, relational tables. In one embodiment, the normalization module 328 normalizes the nested object by parsing, or dividing, the nested object into one or more components and generates a distinct table for each component (i.e. nested object) in the relational schema. For example, again referring to the MongoDB "employee" document example: "employee: {name: Brody, address: {street: 1234 Street, city: Raleigh, state: NC} emails: [brody.mes@123.com, brody.mes@456.com]}." In one embodiment, the normalization module 328 parses the nested objects (address and emails) into separate relational tables. For example, the normalization module 328 normalizes the "employee" document by incorporating the document into an "Employee" table with "id" and "name" columns where "id" is the primary key, a distinct Employee_address" table with "Employee.id," "street," "city" and "state" columns where a compound primary key is created based on the columns of the table and "Employee.id" is a foreign key, and a distinct "Employee emails" table with "Employee.id," "index" and "emails" columns where index and Employee.id form a compound primary key and "Employee.id" is a foreign key. Again, it should be noted that the names of the columns and tables are merely examples and that different names and a different naming convention may be used. However, the naming convention used in the example may beneficially provide a user insight into the relationship between the tables and columns in the relational schema and the objects and nested objects of the non-relational database. For example, the user may discern that an "address" object nested in an "employee" document, includes street, city and state.

In one embodiment, the normalization module 328 passes the normalized nested objects to the schema generation module 336. In one embodiment, the normalization module 328 stores the normalized nested objects in memory 204 (or any other non-transitory storage medium communicatively accessible). The other modules of the schema tool 109 including, e.g., the schema generation module 336, may retrieve the normalized nested objects by accessing the memory 204 (or other non-transitory storage medium).

The custom schema module 330 includes code and routines for determining a customized relational schema. In one embodiment, the custom schema module 330 is a set of instructions executable by the processor 202. In another embodiment, the custom schema module 330 is stored in the memory 204 and is accessible and executable by the processor 202. In either embodiment, the custom schema module 330 is adapted for cooperation and communication with the processor 202, other components of the computing device 106/122 and other components of the schema tool 109.

In one embodiment, custom schema module 330 determines a customized relational schema. In one embodiment, the custom schema module 330 determines a customized relational schema based on a user selection. For example, in one embodiment, a user 112 is presented and selects an option to generate a customized relational schema type and provides further user input defining the customized schema.

In one embodiment, the custom schema module 330 receives one or more inputs defining a customized relational schema. For example, assume the database identifier module 324 obtains the data structure of the non-relational database and the user interface module 322 presents that data structure to the user 112; in one embodiment, the custom schema module 330 receives a selection of a portion (e.g. a set of fields and/or columns) of the data structure of the non-relational database for incorporation into the relational schema.

For example, assume the non-relational database is a document-oriented, non-relational database (e.g. MongoDB) that includes the "employee" document, as discussed above, and an "insurance" document; in one embodiment, responsive to selecting the "employee" document for inclusion in the relational schema, the "employee" document is included in the relational schema to be generated and the unselected "insurance" document is omitted from the relational schema to be generated. In another example, the nested "address" object in the "employee" document may be selected for inclusion in the relational schema and the "emails" nested object may remain unselected or may be selected for omission from the relation schema.

In one embodiment, the custom schema module 330 receives a table definition from the user. A table definition defines the existence (e.g. number of tables) and properties (e.g. data types) of one or more tables for inclusion in the relational schema. For example, the custom schema module 330 may receive a table definition for a first table incorporating at least a portion of an "insurance" document and a second table incorporating at least a portion of the employee document. In another example, the custom schema module 330 may receive a table definition for a MongoDB collection that includes the "employee" document and receive a table definition based on user input that the "address" object is to be flattened into a first relational table titled "Employee" and the "emails" object is to be normalized into a second and distinct relational table titled "Emails." In yet another example, the custom schema module 330 may receive a custom schema definition defining data types associated with one or more of a table and a column in the relational schema. For example, assume the DB identifier module 324 when identifying the non-relational database determines that the fields in the non-relational database have a common data type or determines the fields have disparate data types. In one embodiment, the custom schema module 330 assigns the common data type when a common data type is present, automatically assigns a best fit data type based on the analysis performed by the DB identifier module 324 (e.g. assigns an INTEGER SQL data type responsive to determining an "Address.Number" field includes only Int data types in the non-relational database) and assigns a default data type (e.g. varchar(8000)) when a best fit data type may not be determined. In one embodiment, the custom schema module 330 may modify the data type based on user input. In one embodiment, the custom schema module 330 may interact and cooperate with one or more of the flattening module 326 and normalization module 328 for flattening and normalizing, respectively, portions of the non-relational database based on the customized schema.

In one embodiment, the custom schema module 330 passes the customized schema to one or more modules 322, 326, 328, 330, 332, 334, 336 of the schema tool 109. For example, the custom schema module 330 is communicatively coupled to one or more modules 322, 326, 328, 330, 332, 334, 336 of the schema tool 109 to send the customized schema to one or more modules 322, 326, 328, 330, 332, 334, 336 of the schema tool 109. In another embodiment, the custom schema module 330 stores the customized schema in memory 204 (or any other non-transitory storage medium communicatively accessible), and the one or more modules 322, 326, 328, 330, 332, 334, 336 of the schema tool 109 may retrieve the customized schema by accessing the memory 204 (or other non-transitory storage medium).

The naming conflicts module 332 includes code and routines for resolving naming conflicts for the relational schema. In one embodiment, the naming conflicts module 332 is a set of instructions executable by the processor 202. In another embodiment, the naming conflicts module 332 is stored in the memory 204 and is accessible and executable by the processor 202. In either embodiment, the naming conflicts module 332 is adapted for cooperation and communication with the processor 202, other components of the computing device 106/122 and other components of the schema tool 109.

In some embodiments, the relational schema generated complies with the SQL92 standard where table and column names are not case sensitive unless quoted. However, these identifiers in a non-relational database may be case sensitive. For example, assume that the non-relational database is a MongoDB database with collections (i.e. tables) titled "TEST," "Test" and "test" and the schema generation module 336 generates a SQL92 compliant schema by capitalizing all identifiers (i.e. table names and columns). Therefore, to avoid impermissibly assigning the identifier "TEST" to the three tables, in one embodiment, the naming conflicts module 332 resolves the naming conflict. For example, in one embodiment, the naming conflicts module 332 appends one or more characters to one or more of the conflicting identifiers. For example, the naming conflicts module 332 appends "_#" where # is an integer, so "TEST" "Test" and "test" of the non-relational database are named "TEST," "TEST_1" and "TEST_2," respectively, by the naming conflicts module 332. It will be recognized the preceding is merely an example of resolving a naming conflict and that other examples exist. For example, prepending characters, using synonyms, appending different characters, assigning a random string, etc.

It should be recognized that SQL92 compliance is only one reason a naming conflict may occur and other reasons exist and may be resolved by the naming conflicts module 332. For example, assume that when normalizing a non-relational database one of the virtual tables created (e.g. an employee_address table) conflicts with a table that was already defined (e.g. a table already defined employee_address); in one embodiment, the naming conflicts module 332 resolves the naming conflict (e.g. by appending an integer or character to the table name).

In one embodiment, the naming conflicts module 332 notifies the user of a naming conflict. For example, the naming conflicts module 332 issues a notification to the user that "TEST," "Test" and "test" were involved in a name collision (i.e. naming conflict). In one embodiment, the naming conflicts module 332 notifies the user of the resolution of a naming conflict. For example, the naming conflicts module 332 issues a notification to the user that "TEST" "Test" and "test" were involved in a name collision (i.e. naming conflict) and have been assigned the non-conflicting names "TEST," "TEST_1" and "TEST_2," respectively.

In one embodiment, the naming conflicts module 332 resolves the naming conflict automatically. For example, the naming conflicts module 332 automatically detects the naming conflict created by "TEST," "Test" and "test" collections in the non-relational database and automatically assigns the names "TEST," "TEST_1" and "TEST_2," respectively. In one embodiment, the naming conflicts module 332 resolves the naming conflict based at least in part on user input. For example, the naming conflicts module 332 automatically detects the naming conflict created by "TEST," "Test" and "test" collections in the non-relational database and presents one naming conflict to the user at a time. Such an embodiment may beneficially prevent a user from forgetting which identifiers were involved in the collision and the new names used to resolve the name collision. In one embodiment, the naming conflicts module 332 may receive a non-conflicting name from the user to resolve the name collision.

In one embodiment, the naming conflicts module 332 passes naming information including the non-conflicting name(s) (e.g. TEST_2) and the associated identifier in the non-relational database (e.g. "test") to the schema generation module 336. For example, the naming conflicts module 332 is communicatively coupled to the schema generation module 336 to send the naming information to the schema generation module 336. In another embodiment, the naming conflicts module 332 stores the naming information in memory 204 (or any other non-transitory storage medium communicatively accessible), and the schema generation module 336 may retrieve the naming information by accessing the memory 204 (or other non-transitory storage medium).

The relationship module 334 includes code and routines for defining relationships between the two or more tables in the relational schema. In one embodiment, the relationship module 334 is a set of instructions executable by the processor 202. In another embodiment, the relationship module 334 is stored in the memory 204 and is accessible and executable by the processor 202. In either embodiment, the relationship module 334 is adapted for cooperation and communication with the processor 202, other components of the computing device 106/122 and other components of the schema tool 109.

The relationship module 334 determines that the relational schema includes multiple tables. In one embodiment, the relationship module 334 determines that the relational schema includes multiple tables defined from a single table in the non-relational database. For example, the relationship module 334 determines that a nested object is to be normalized into a distinct child table or that the table definition for a custom schema includes two or more tables.

The relationship module 334 defines relationships between relational tables in the relational schema. In one embodiment, the relationship module 334 defines a relationship between two tables defined from a single table in the non-relational database. For example, in one embodiment, the relationship module 334 interacts with the normalization module 328 and defines the foreign key to create the parent-child relationship between the distinct, normalized tables discussed above with reference to the normalization module 328 and nested objects. In one embodiment, the relationship module 334 defines the relationship using a GUI. For example, in one embodiment, the user interface module 322 provides one or more GUIs that allow the user to select a table, select a field that indicates "Foreign Key: none" and define a foreign key (e.g. using right click and selecting a "Define Foreign Key" option and select a second table for relationship with the foreign key. In one embodiment, the foreign key is an "id" field. For example, a foreign key may take the form "<tablename>.id."

In one embodiment, the relationship module 334 passes the relationships to the schema generation module 336. For example, the relationship module 334 is communicatively coupled to the schema generation module 336 to send the relationships to the schema generation module 336. In another embodiment, the relationship module 334 stores the relationships in memory 204 (or any other non-transitory storage medium communicatively accessible), and the schema generation module 336 may retrieve the relational model by accessing the memory 204 (or other non-transitory storage medium).

The schema generation module 336 includes code and routines for generating a relational schema of the non-relational database. In one embodiment, the schema generation module 336 is a set of instructions executable by the processor 202. In another embodiment, the schema generation module 336 is stored in the memory 204 and is accessible and executable by the processor 202. In either embodiment, the schema generation module 336 is adapted for cooperation and communication with the processor 202, other components of the computing device 106/122 and other components of the schema tool 109.

The schema generation module 336 generates the relational schema. In some embodiments, the schema tool 109 may only generate one type of relational schema in which case, the schema generation module 336 determines to generate the supported relational schema type. In one embodiment, the schema generation module 336 determines a relational schema type and generates the relational schema based on the relational schema type. In one embodiment, the relational schema type is user selected. For example, in one embodiment, a user 112 is presented the option for a flattened relational schema, a normalized relational schema and a custom relational schema. In one embodiment, a flattened relational schema is a relational schema in which all nested objects are flattened. In one embodiment, a normalized relational schema may be a fully normalized or a hybrid normalized schema. A fully or "regular" normalized relational schema is a relational schema in which all nested objects are normalized into parent and child tables.

A hybrid normalized schema is one in which the schema generation module 336 automatically determines whether a portion of a nested object is flattened or normalized based on a characteristic of that portion. For example, assume the non-relational database is a MongoDB database storing restaurant documents which include an "address" array and a "menu items" array and assume the "address" array for every restaurant is a two-element array (e.g. latitude and longitude or street number and street name) and the number of elements in the "menu items" array varies among the restaurants because different restaurants may have a different number of items on their menus. In one embodiment, the schema generation module 336 performs hybrid normalization, which may include analyzing the "address" array and "menu items" array determining that the "address" array has a consistent number of elements and the "menu items" array has a variable number of elements and generates a relational schema that flattens the "address" array (e.g. into columns address.latitude and address.longitude) and normalizes the "menu items" array by incorporating the "menu items" array into a distinct "menu items" child table.

In one embodiment, the schema generation module 336 generates a default schema type (e.g. flattened, fully normalized or hybrid normalized depending on the embodiment) responsive to schema tool 109 being launched headlessly by the driver 228.

In one embodiment, the schema generation module 336 interacts with one or more of the modules of the schema tool 109 to generate the selected type of schema. For example, in one embodiment, responsive to determining a flattened relational schema type, the schema generation module 336 receives one or more flattened nested objects from the flattening module 326, naming information from the naming conflicts module 332 and relationships (if any) from the relationship module 334, and the schema generation module 336 generates a flattened relational schema 226 therefrom. In another example, in one embodiment, responsive to determining a normalized relational schema type, the schema generation module 336 receives a normalized nested object from the flattening module 326, relationships from the relationship module 334 and naming information from the naming conflicts module 332, and the schema generation module 336 generates a normalized relational schema 226 therefrom. In still another example, in one embodiment, responsive to determining a normalized schema type, the schema generation module 336 analyzes the data structure obtained by the DB identifier module 324, determines which portions of the non-relational database (if any) to flatten and which portions (if any) to normalize in order to generate a hybrid normalized relational schema, coordinates with the flattening module 326 and normalizing module 328 to flatten and/or normalize, respectively, based on the determination, receives relationships (if any) from the relationship module 334, receives naming information (if any) from the naming conflicts module 332 and generates a hybrid normalized relational schema 226 therefrom. In yet another example, in one embodiment, responsive to determining a customized relational schema type, the schema generation module 336 receives a table definition for determining the one or more relational tables included in the schema and the portions of the non-relational database to be included in the relational schema from the custom schema module 330, coordinates with the flattening module 326 and normalizing module 328 when nested objects are to be flattened or normalized, respectively, according to the customized schema, receives relationships (if any) from the relationship module 334, receives naming information (if any) from the naming conflicts module 332 and generates a customized relational schema 226 therefrom.

In one embodiment, the user interface module 322 may use the relational schema generated by the schema generation module 336 to provide a preview of the data stored in the non-relational database identified by the database identifier module 324 in a relational form. For example, in one embodiment, the user is presented a preview of the "Employee_address" table that includes a preview of the data in that table (e.g. "1234 Street" in the street column, "Raleigh" in the city column and "NC" in the state column).

In one embodiment, the relational schema is stored as a file (i.e. relational schema 226) which may be used by one or more of a driver 228 to expose and access data in the non-relational database to applications and by the schema tool 109 for subsequent modification. Depending on the embodiment, the file format of the relational schema generated by the schema generation module 336 may vary. For example, the relational schema may be an XML (e.g. .config, .map, .native, etc.), JavaScript Object Notation (JSON), Binary JavaScript Object Notation (BSON) or other file format. Additionally, while FIG. 2 illustrates that the relational schema 226 may be stored on a server 122 or client device 106, in some embodiments, the relational schema 226 may be stored with the non-relational database 120 which the relational schema is based upon, e.g., on a database server (not shown) that includes that non-relational database 120.

In one embodiment, in addition to storing the relational schema's data structure (e.g. how at least a portion of the columns and fields of the non-relational database may be mapped to one or more relational tables), the relational schema may include additional information. For example, in one embodiment, the relational schema may include information about the data structure of the non-relational database, which may be used by the tracking module 338 described below. In one embodiment, the relational schema may include information about tables and fields of the non-relational database that are not included in the relational schema so that the tracking module 338 does not detect those tables and/or fields as new.

In one embodiment, the schema generation module 336 passes the relational schema to one or more of the tracking module 338 and the driver 228. For example, the schema generation module 336 is communicatively coupled to the driver 228 to send the relational schema to one or more of the tracking module 338 and the driver 228. In another embodiment, the schema generation module 336 stores the relational schema in memory 204 (or any other non-transitory storage medium communicatively accessible), and one or more of the driver 228, tracking module 338 and the schema loading module 340 may retrieve the relational model by accessing the memory 204 (or other non-transitory storage medium).

The tracking module 338 includes code and routines for tracking changes associated with the non-relational database. In one embodiment, the tracking module 338 is a set of instructions executable by the processor 202. In another embodiment, the tracking module 338 is stored in the memory 204 and is accessible and executable by the processor 202. In either embodiment, the tracking module 338 is adapted for cooperation and communication with the processor 202, other components of the computing device 106/122 and other components of the schema tool 109.

The tracking module 338 tracks changes associated with the non-relational database. In one embodiment, the tracking module 338 tracks whether new tables are added to the non-relational database. For example, the tracking module 338 tracks a MongoDB database and determines whether a new collection (i.e. table) has been added to the MongoDB since the last time the schema tool 109 was run to generate the relational schema for that MongoDB database.

In one embodiment, the tracking module 338 notifies the user upon detecting a change associated with the non-relational database. For example, in one embodiment, upon detecting a new collection in a MongoDB database, the tracking module 338 signals the user interface module 322 to present a GUI asking the user 112 whether he/she would like to the new collections included in the relational schema as flattened tables, expose all new collections as normalized tables, manually expose all new collections in a custom schema or dismiss the add table wizard for adding new collections to the relational schema.

In one embodiment, the tracking module 338 tracks changes associated with the non-relational database by verifying that the relational schema still points to valid tables in the non-relational database.

The schema loading module 340 includes code and routines for loading a generated relational schema of a non-relational database table for modification. In one embodiment, the schema loading module 340 is a set of instructions executable by the processor 202. In another embodiment, the schema loading module 340 is stored in the memory 204 and is accessible and executable by the processor 202. In either embodiment, the schema loading module 340 is adapted for cooperation and communication with the processor 202, other components of the computing device 106/122 and other components of the schema tool 109.

As mentioned above, in some embodiments, the relational schema once generated by the schema generation module 336 may be subsequently modified. For example, the relational schema may be modified based on changes to the non-relational database and/or to the application that uses a driver 228, where that driver 228 uses the relational schema 226 to expose and access data in the non-relational database. For example, in one embodiment, the schema loading module 340 loads the schema so the user may modify the relational schema to remove a table by removing, using the relationship module 334, the relationships (e.g. foreign keys) from the tables in the other tables in the schema, removing the table from the schema using the custom schema module 330, and generating (e.g. saving) the new relational schema without the removed table using the schema generation module 336.

Example Methods

Figure 4:
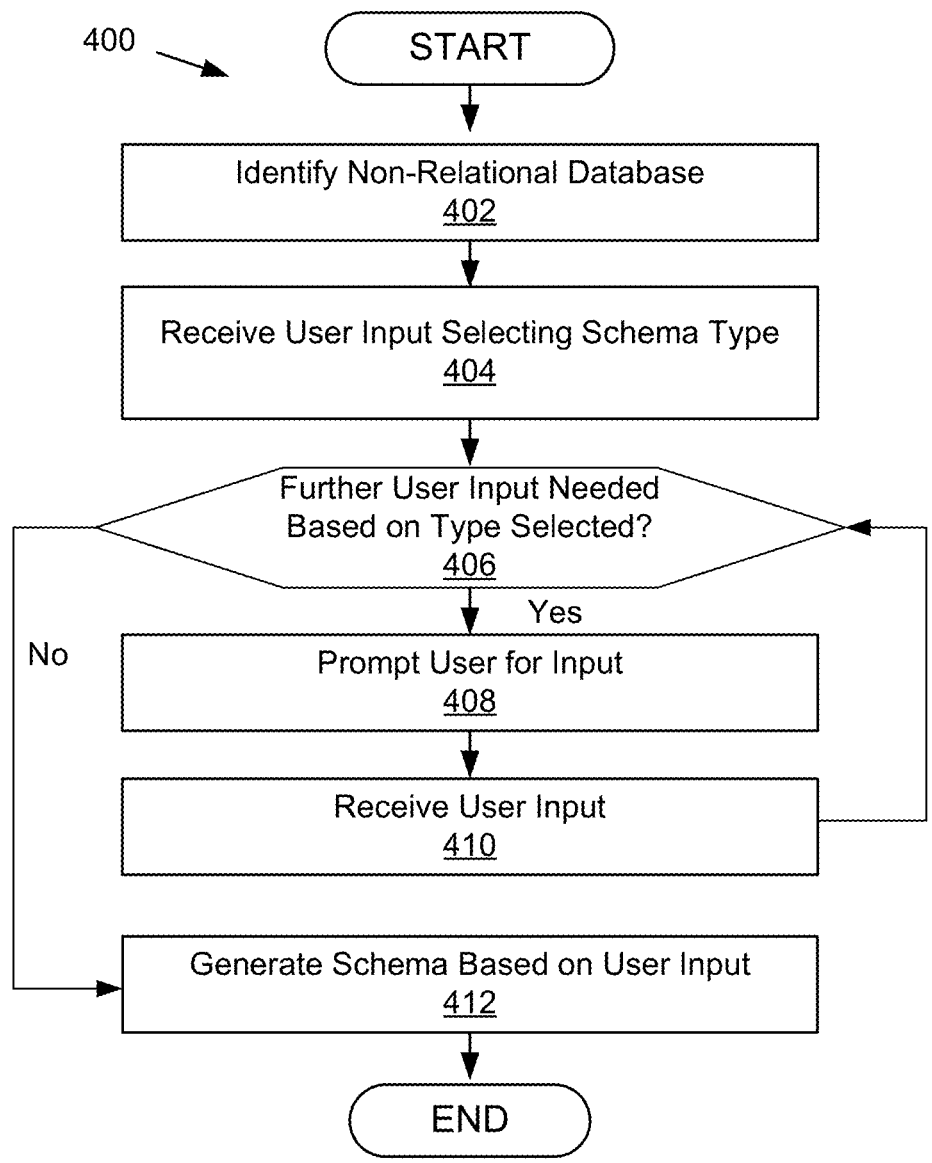
FIG. 4 is a flowchart of an example method for generating a relational schema for the non-relational database according to one embodiment.

FIG. 4 depicts method 400 performed by the system described above in reference to FIGS. 1-3. The method 400 begins at block 402. At block 402, the DB identifier module 324 identifies a non-relational database. At block 404, the user interface module 322 receives user input selecting a schema type. At block 406, the schema generation module 336 determines whether further user input is needed based on the schema type selected at block 404.

When the schema generation module 336 determines more user input is needed based on the schema type selected (406-Yes), the user interface module 322 prompts the user for that input at block 408 and receives user input at block 408 before returning to block 406. When the schema generation module 336 determines no more user input is needed based on the schema type selected (406-No), the schema generation module 336 generates a relational schema based on the user input.

Figure 5:
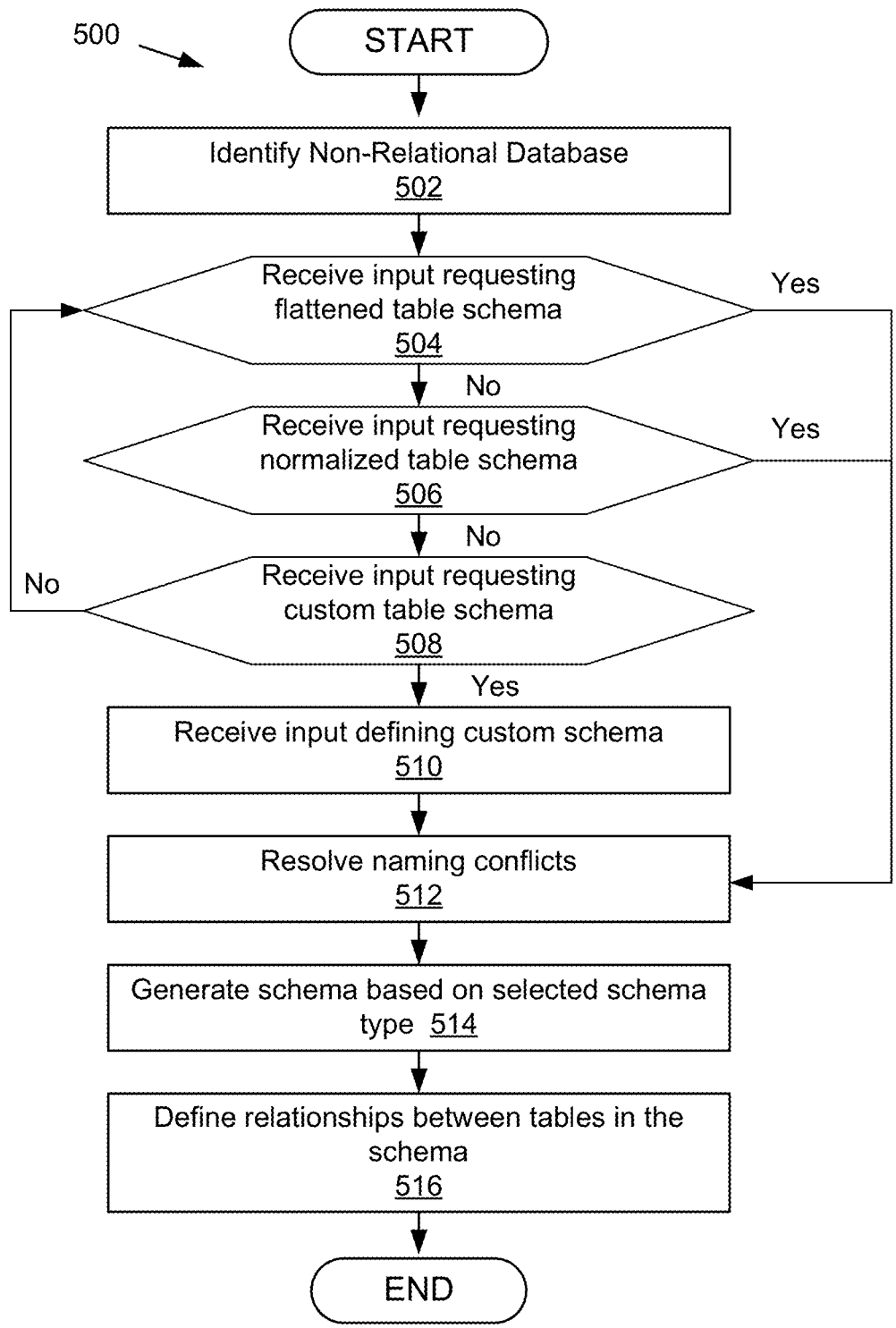
FIG. 5 is a flowchart of an example method for generating a relational schema for the non-relational database according to one embodiment.

FIG. 5 depicts method 500 performed by the system described above in reference to FIGS. 1-3. The method 500 begins at block 502. At block 502, the database identifier module 324 identifies the non-relational database. At block 504, the schema generation module 336 determines whether a request for a flattened table schema has been received.

When the schema generation module 336 determines a request for a flattened table schema has been received (504-Yes), the method 500 continues at block 512. When the schema generation module 336 determines no request for flattened table schema has been received (504-No), the method 500 continues at block 506.

At block 506, the schema generation module 336 determines whether a request for a normalized table schema type has been received. When the schema generation module 336 determines a request for a normalized table schema has been received (506-Yes), the method 500 continues at block 512. When the schema generation module 336 determines no request for a normalized table schema has been received (506-No), the method 500 continues at block 508.

At block 508, the schema generation module 336 determines whether a request for a customized table schema type has been received. When the schema generation module 336 determines no request for a customized table schema has been received (508-No), the method 500 continues at block 504 and blocks 504-508 are repeated until an input requesting a relational schema type is received. When the schema generation module 336 determines a request for a customized table schema has been received (508-Yes), the method 500 continues at block 510. At block 510, the custom schema module 330 receives input defining a custom schema.

At block 512, the naming conflicts module 332 resolves naming conflicts (if any). At block 514, the schema generation module 336 generates the relational schema based on the requested schema type determined in one of block 504, 506 and 508. In some embodiment, depending on the schema type requested, the schema generation module coordinates with one or more of the flattening module 326 and the normalization module 328 in generating the relational schema at block 514. At block 516, the relationship module 334 defines relationships (if any) between tables in the relational schema generated at block 514. The method 500 then ends according to one embodiment.

Example GUIs

Figure 6:
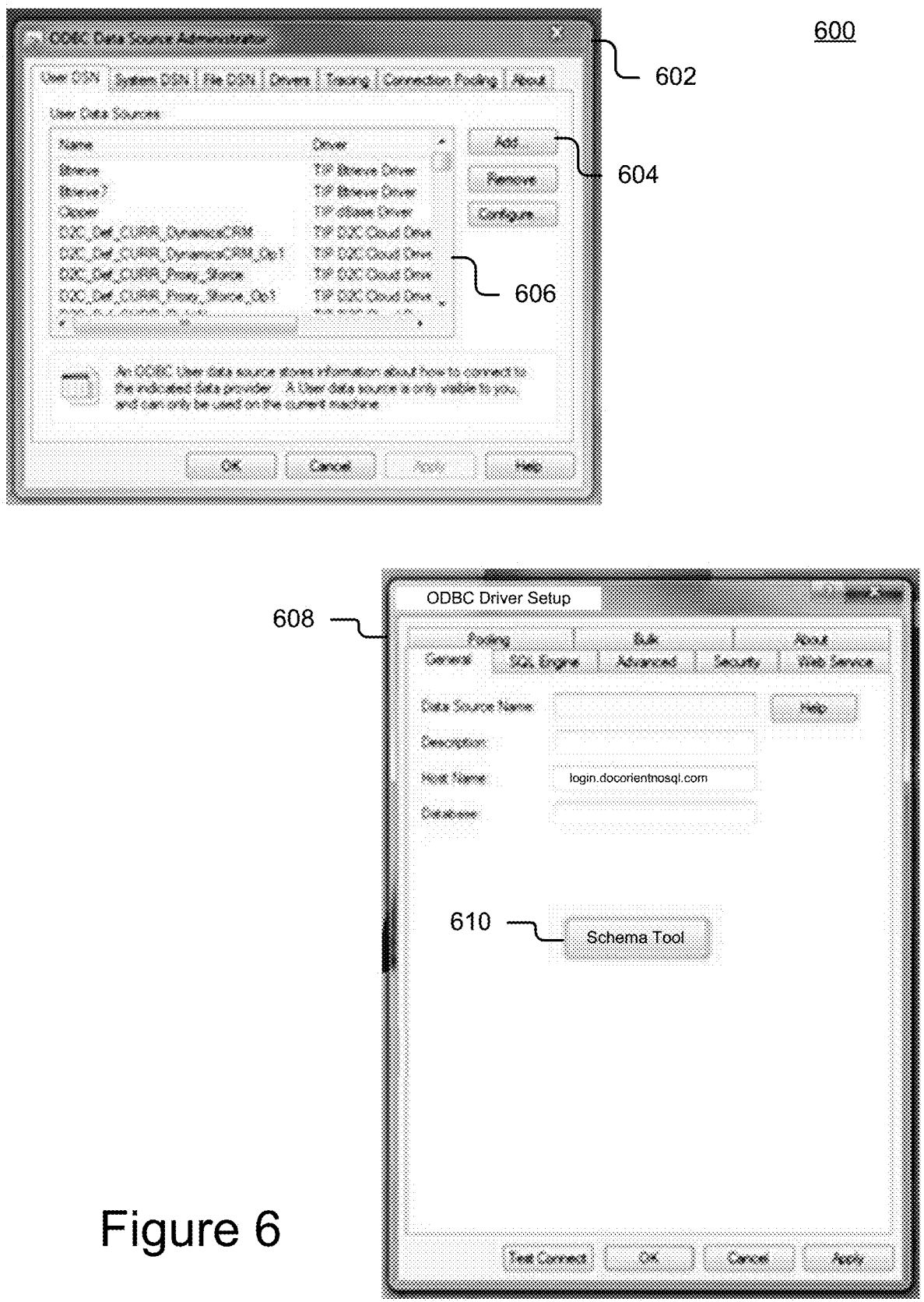
FIG. 6 is an example of user interfaces for launching a schema tool for generating a relational schema for the non-relational database according to one embodiment.
Figure 7:
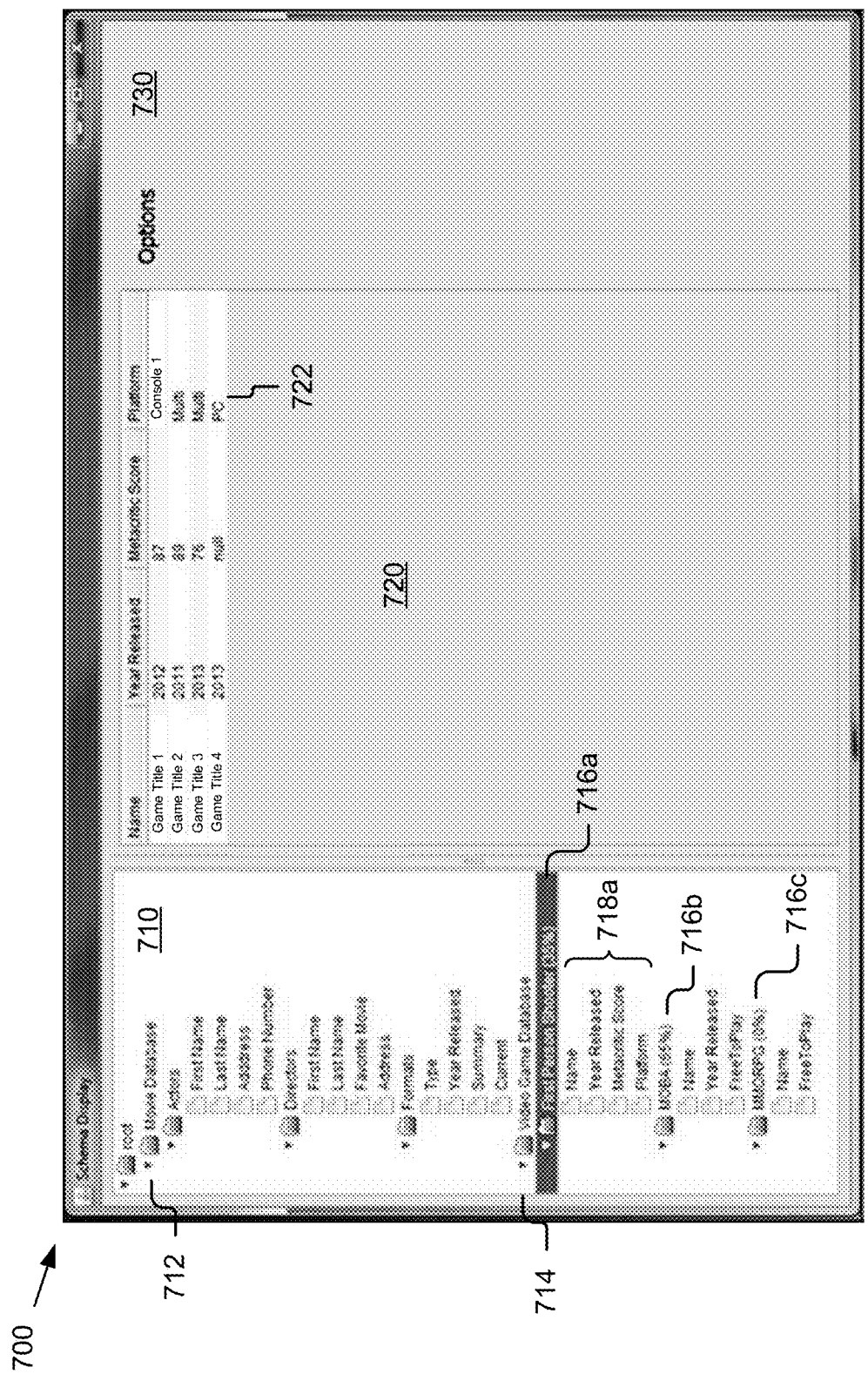
FIG. 7 is an example of a user interface for manipulating a relational schema for the non-relational database according to one embodiment.
Figure 8:
FIG. 8 is an example of another user interface for manipulating a relational schema for the non-relational database according to one embodiment.

FIGS. 6-8 are example graphic representations of user interfaces for generating a relational schema for a non-relational database according to one embodiment. FIG. 6 is a graphic representation of a display screen 600 presenting a first GUI 602 and a second GUI 608. In the illustrated embodiment, an ODBC Data Source Administrator has been launched resulting in the GUI 602 being displayed to the user. GUI 602, in the illustrated embodiment, allows the user to select a data source from list 606 to be configured or removed and add a new data source by selecting button 604. In one embodiment, responsive to selecting to configure or add a new data source, the ODBC Driver Setup GUI 608 is displayed. In one embodiment, the ODBC Driver Setup GUI 608 includes a button 610 that when selected launches the schema tool 109.

FIG. 7 is a graphic representation of a user interface 700 generated by the schema tool 109 for presenting a representation of the relational schema generated by the schema tool. In the illustrated embodiment, the user interface 700 includes a plurality of portions 710, 720, 730 for presenting information to the user. While three portions 710, 720, 730 are illustrated side-by-side, in other embodiments, a different number of portions may be configured in a similar or different configuration. In the illustrated embodiment, the left portion 710 of the user interface may present a hierarchical list of one or more databases, the tables in each of the one or more databases and the one or more columns of the one or more tables in each database. For example, the left portion 710 of the user interface 700 displays two database (i.e. a Movie Database 712 and a Video Game Database 714). In the illustrated embodiment, the Video Game Database 714 includes a First Person Shooter table 716a, a MOBA table 716b and a MMORPG table 716c along with table statistics associated with each table and displayed in-line. In the illustrated embodiment, the First Person Shooter table 716a includes columns 718a which are displayed by name.

In one embodiment, at least a portion of the user interface 700 is context sensitive. For example, in one embodiment, upon selection of a table (e.g. 716a) in the left portion 710 of the user interface 700, the middle portion 720 of the user interface 700 displays a preview 722 and the right portion 730 of the user interface 700 displays one or more options (not shown) based on the selection. In the illustrated embodiment, a preview 722 of the First Person Shooter table 716a is displayed. The preview 722 includes the columns 718 associated with the First Person Shooter table 716a as well as a preview of the data by including data about first person shooter games and associated information in the preview 722.

In one embodiment, the right portion 730 of the user interface 700 displays one or more options for manipulating the schema. While no options are shown in the illustrated embodiment, in one embodiment, options appear based on the portion of the schema a user selects. For example, in one embodiment, upon selection of the First Person Shooter table 716a, a preview 722 is displayed and options (not shown) to remove the table 716a, add or remove a column 718 from the table, relate the table 716a to another table, modify the amount of data displayed in the preview 722, etc. are displayed in the right portion 730 of the user interface 700. In one embodiment, the right portion 730 of the user interface 700 is omitted and options may be accessed by selecting a menu, by right clicking on a table, column, etc.

FIG. 8 is a graphic representation of a user interface 800 generated by the schema tool 109 for presenting a table view according to one embodiment. In one embodiment, the table view is presented in a separate interface. For example, referring again to FIG. 7, user interface 800 may be displayed when a user selects to add another table to the schema displayed in the left portion 710 of user interface 700 and allow the user to configure data types within the newly requested table of the relational schema. In one embodiment, the table view may be included in another user interface. For example, in one embodiment, a table view similar to that of user interface 800 may be presented below the preview 722 in the middle portion 720 of user interface 700 in FIG. 7 and include information (e.g. data types, etc.) associated with the First Person Shooter table 716a.

Referring again to FIG. 8, the table view informs the user of elements of a table in the relational schema. For example, user interface 800 displays field information including Field Names 802, Preferred Name 804, SQL Type 806, Native Data Type 808, Max Length 810, Density or Number of Rows 812, Minimum Array Elements 814, Maximum Array Elements 816, Hierarchy 818 and Size 820 information in a tabular format. In one embodiment, the user may change the display in the user interface 800 (e.g. alter how complex and basic data types are displayed). In one embodiment, the user may modify the information displayed. For example, in one embodiment, a user may alter a data type of a field from Int to Float from this view.

In the illustrated embodiment, basic and complex data types are displayed together in a hierarchical display with hierarchy information displayed in the "Hierarchy" column 818. In the illustrated embodiment, the "Address" field is a complex data type. Specifically, the "Address" field may be a nested document with fields "Number" and "Street." This allows a user to make data type and hiding/showing decisions on each part of the complex data independently. In one embodiment, the "SQL Type" column 806 includes text fields or pull-down menus that allow modification of the data type associated with a field in the relational schema. In one embodiment, the "Max Length" column 810 is a numerical representation of the amount of data (e.g. length or precision of varchar column) that is stored in the column being described by a row in the table view user interface 800. In one embodiment, the "Size (%)" column 820 displays the percentage of the table's storage space for which the associated field accounts. For example, the name field accounts for 27% of the total number of bytes that the table occupies. In some embodiments, the user interface 800 includes a "Native Data Type(s)" column 808 that displays the one ore native (e.g. MongoDB) data types used for the field. It should be noted that in some embodiments a non-relational database (e.g. MongoDB) may allow data types to differ between rows (e.g. document to document); therefore, in one embodiment, different rows may have multiple different values and displays a percentage of the rows sampled with a given data type. For example, the "Date" row indicates that 90% of the dates sampled have a Date/Time data type in the non-relational database and 10% have a string data type. In some embodiments, the user interface 800 may include Min and Max Array Elements columns 814, 816, which display the minimum and maximum number of array elements found in the array field, respectively. In some embodiments, the min and max number of array elements may be used to determine whether to flatten or normalize the array.

In one embodiment, a preview button (not shown) may be associated with the table view of user interface 800. In one embodiment, the preview button, upon selection, opens a new user interface (not shown) that displays a tabular representation of the data based on the changes made in the table view of user interface 800.

In one embodiment, the table view user interface 800 may include a column 804 that allows the user to modify the name of the column displayed. For example, the table view user interface 800 may include a "Native Name" or "Preferred Name" column 804. In one embodiment, a user may select multiple columns, which are associated with as rows in the table view of interface 800 and make common changes to the selected columns.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
identifying, using one or more processors, a non-relational database including a nested object;
obtaining, using one or more processors, a data structure of the non-relational database;
identifying, using the one or more processors, the nested object; and
generating, using the one or more processors, a virtual, relational schema that includes a first virtual, relational table and a second virtual, relational table and, at least partially, normalizes the nested object within a non-relational database to the second virtual, relational table, wherein generating the virtual, relational schema includes:
generating a mapping of the data structure of the non-relational database to the first virtual, relational table and the second virtual, relational table, and
defining a relation between the first virtual, relational table and the second virtual, relational table so that the virtual, relational schema is usable to obtain data, stored in the non-relational database, from the non-relational database responsive to a relational query.

2. The computer-implemented method of claim 1, wherein the nested object includes an array.

3. The computer-implemented method of claim 1, wherein the nested object includes an array, and the nested object is at least partially normalized based on a characteristic of the array.

4. The computer-implemented method of claim 1, wherein the nested object includes an array, and the array has a number of elements that varies between a first instance and a second instance.

5. The computer-implemented method of claim 1, wherein the method further comprises:
receiving user input; and
modifying the virtual, relational schema based on the user input.

6. The computer-implemented method of claim 1, wherein the method further comprises:
receiving a relational query requesting modification of data, the data stored in the non-relational database; and
translating, using the virtual, relational schema, the relational query into a query for the non-relational database, the query instructing the non-relational database to modify the data stored in the non-relational database.

7. The computer-implemented method of claim 1, wherein the method further comprises:
translating, using the virtual, relational schema, a relational query into a query for the non-relational database; and
translating, using the virtual, relational schema, a first result from the non-relational database into a second result, the second result using a relational language.

8. The computer-implemented method of claim 1, wherein the virtual, relational schema is stored as a JavaScript Object Notation (JSON) file.

9. The computer-implemented method of claim 1, wherein the non-relational database is a MongoDB database.

10. A computer program product comprising a non-transitory computer usable medium including a computer readable program, wherein the computer readable program when executed on a computing device causes the computing device to:
identify a non-relational database including a nested object;
obtain a data structure of the non-relational database;
identify the nested object; and
generate a virtual, relational schema that includes a first virtual, relational table and a second virtual, relational table, and at least partially, normalizes the nested object to the second virtual, relational table, wherein generating the virtual, relational schema includes generating a mapping of the data structure of the non-relational database to the first virtual, relational table and the second virtual, relational table and defining a relation between the first virtual, relational table and the second virtual, relational table so that the virtual, relational schema is usable to obtain data, stored in the non-relational database, from the non-relational database responsive to a relational query.

11. A system comprising:
a processor;
a memory storing instructions that, when executed, cause the system to:
identify a non-relational database including a nested object;
obtain a data structure of the non-relational database;
identify the nested object; and
generate a virtual, relational schema that includes a first virtual, relational table and a second virtual, relational table, and at least partially, normalizes the nested object to the second virtual, relational table, wherein generating the virtual, relational schema includes generating a mapping of the data structure of the non-relational database to the first virtual, relational table and the second virtual, relational table and defining a relation between the first virtual, relational table and the second virtual, relational table so that the virtual, relational schema is usable to obtain data, stored in the non-relational database, from the non-relational database responsive to a relational query.

12. The system of claim 11, wherein the nested object includes an array.

13. The system of claim 11, wherein the nested object includes an array, and the nested object is at least partially normalized based on a characteristic of the array.

14. The system of claim 11, wherein the nested object includes an array, and the array has a number of elements that varies between a first instance and a second instance.

15. The system of claim 11, the memory further storing instructions that, when executed cause the system to:
receive user input; and
modify the virtual, relational schema based on the user input.

16. The system of claim 11, the memory further storing instructions that, when executed cause the system to:
receive a relational query requesting modification of data, the data stored in the non-relational database; and
translate, using the virtual, relational schema, the relational query into a query for the non-relational database, the query instructing the non-relational database to modify the data stored in the non-relational database.

17. The system of claim 11, the memory further storing instructions that, when executed cause the system to:
- translate, using the virtual, relational schema, a relational query into a query for the non-relational database; and
- translate, using the virtual, relational schema, a first result from the non-relational database into a second result, the second result using a relational language.

18. The system of claim 11, wherein the virtual, relational schema is stored as a JavaScript Object Notation (JSON) file.

19. The system of claim 11, wherein the non-relational database is a MongoDB database.

\* \* \* \* \*